(12) United States Patent
Moreno et al.

(10) Patent No.: US 9,213,933 B2
(45) Date of Patent: Dec. 15, 2015

(54) SECURE VALUE TOKENS

(71) Applicant: GAMING PARTNERS INTERNATIONAL CORPORATION, Las Vegas, NV (US)

(72) Inventors: Francisco Javier Moreno, Yuma, AZ (US); Emmanuel Gelinotte, Savigny les Beaune (FR); Gregory Scott Gronau, Las Vegas, NV (US); Kirsten Clark, Las Vegas, NV (US); Heriberto Corrales Castaneda, Yuma, AZ (US); Ramon Roberto Saturnino, Sonora (MX); Raul Castro Martinez, Sonora (MX); Joseph Brooks Friedman, Henderson, NV (US)

(73) Assignee: Gaming Partners International Corporation, Las Vegas, NV (US)

( * ) Notice: Subject to any disclaimer, the term of this patent is extended or adjusted under 35 U.S.C. 154(b) by 0 days.

(21) Appl. No.: 13/890,546

(22) Filed: May 9, 2013

(65) Prior Publication Data

US 2014/0332595 A1    Nov. 13, 2014

(51) Int. Cl.
*G06K 19/02*   (2006.01)
*G06K 19/06*   (2006.01)
*G06K 19/077*  (2006.01)
*A44C 21/00*   (2006.01)
*G06K 19/04*   (2006.01)
*G07F 17/32*   (2006.01)
*G07F 7/02*    (2006.01)

(52) U.S. Cl.
CPC .......... *G06K 19/07749* (2013.01); *A44C 21/00* (2013.01); *G06K 19/047* (2013.01); *G07F 7/02* (2013.01); *G07F 17/3251* (2013.01)

(58) Field of Classification Search
CPC ....... A44C 21/00; G06K 19/00; G06K 19/02; G06K 19/41; G06K 19/047; G06K 19/07722
USPC ...................... 235/488, 492; 40/27.5; 463/43; 273/148 R, 288
See application file for complete search history.

(56) References Cited

U.S. PATENT DOCUMENTS

| | | | |
|---|---|---|---|
| 5,673,503 A * | 10/1997 | Rendleman | 40/27.5 |
| 5,676,376 A | 10/1997 | Valley | |
| 6,508,466 B1 * | 1/2003 | Rendleman | 273/148 R |
| 2005/0059479 A1 * | 3/2005 | Soltys et al. | 463/25 |
| 2007/0082734 A1 * | 4/2007 | Mannion | 463/29 |
| 2010/0006654 A1 * | 1/2010 | Poel | 235/492 |
| 2010/0113118 A1 * | 5/2010 | Shigeta | 463/11 |
| 2010/0130288 A1 * | 5/2010 | Shigeta | 463/47 |

FOREIGN PATENT DOCUMENTS

WO    WO 2008/058322    5/2008

* cited by examiner

*Primary Examiner* — Laura Gudorf
(74) *Attorney, Agent, or Firm* — Baker & Hostetler LLP

(57) ABSTRACT

The present invention provides value tokens having improved security while achieving enhanced decorative effects, contrasting edge "spots", increased physical weight, and flexibility of construction and design. Stacked structures formed from pluralities of layers are featured.

19 Claims, 4 Drawing Sheets

SECURE VALUE TOKENS

FIELD AND BACKGROUND OF THE INVENTION

The present invention is directed to value tokens. Value tokens are physical objects which represent cash or other value and are acceptable, at least in certain circumstances, as having a represented cash equivalent or other value. Exemplary among the uses of value tokens are their use in casino gaming where, as chips, plaques or jetons, they form a basis for placing, tracking and honoring wagers. Value tokens also take the form of traditional coinage or currency in common use worldwide. Further, value tokens may be used, e.g. commercially, to represent value in the context of rewards, opportunities, premiums, and the like. In this context, value tokens may be redeemed for other things of value or opportunities having value. The present invention may find utility in any or all of these applications, and, indeed, in all applications where a physical object stands for or represents something of value.

There is a desire for value tokens to be attractive. Decorative features enhance their acceptability. Further, it is desirable that value tokens have weight or "heft" to underscore their physical solidity by reference to traditional heavy metals used for coinage. The ability to distinguish one kind or variety of value token from other similar varieties is also desirable in order that sorting and accounting may be simplified.

BRIEF DESCRIPTION OF THE DRAWINGS

FIG. 5i shows the exemplary use of a decorative outer layer to illustrate the generality of the interchangeability of some of the layers hereof.

Figure 1:
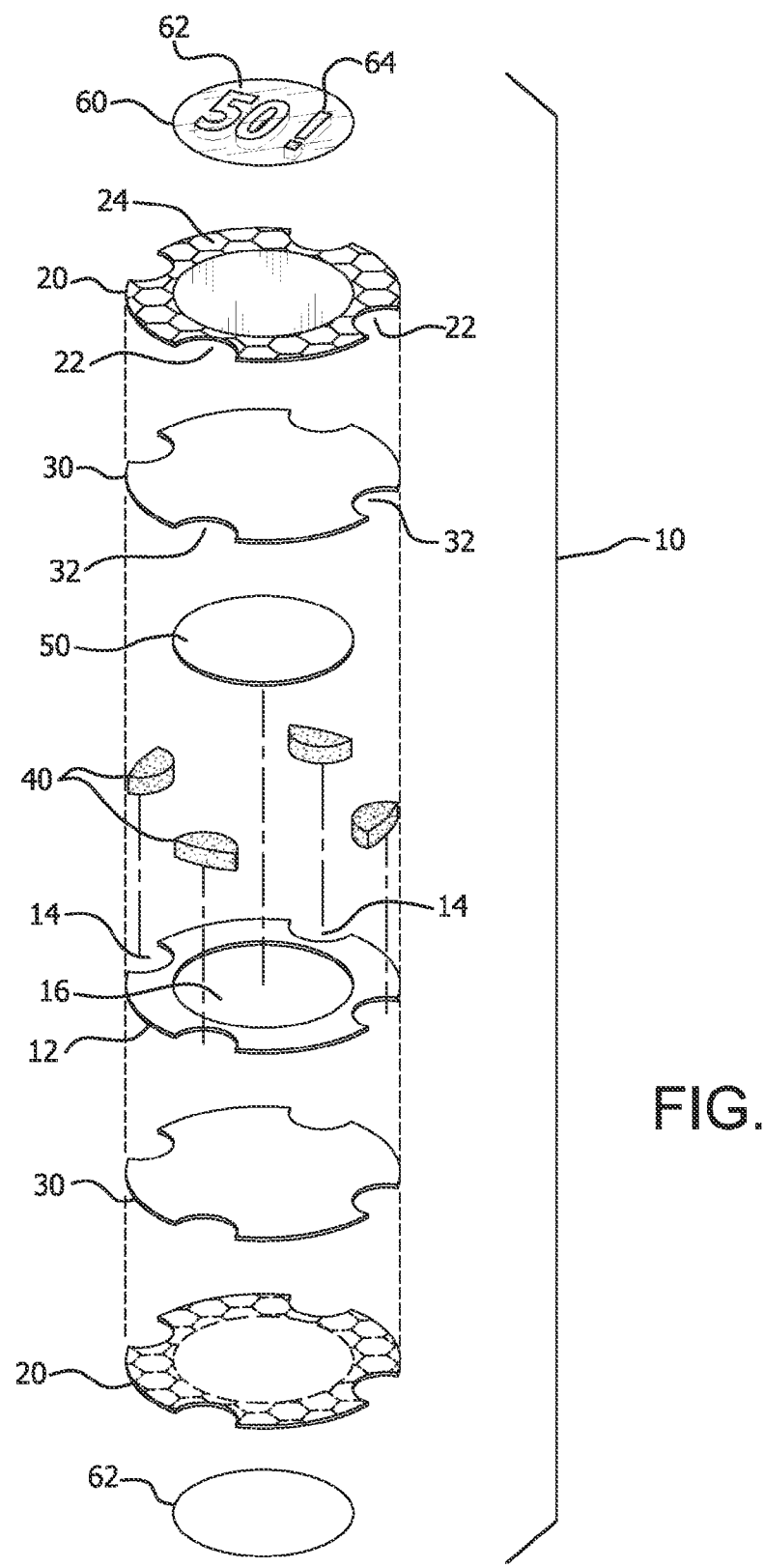
FIG. 1 is a blow up schematic of a value token of the invention.

The present invention provides value tokens comprising a number of layers laminated together. A central layer having two substantially planar sides is superposed by at least two outer layers, one on either side of the central layer. The arrangement of central and outer layers forms a stacked structure and by virtue of the shape of the layers, the stacked structure has a substantially common peripheral geometry. The stacked structure has a plurality of apertures in the periphery, each of which is filled with a solid body. Further, the central layer comprises at least one electronic security device, such as a preferred radiofrequency identification (RFid) chip.

It may be useful in some embodiments for the central layer to be formed such that the electronic security feature is integral with the entire layer. In many embodiments, it is preferred that the central layer be provided with an aperture sized to fit an insert, which insert, itself, contains the security device. In most embodiments, it is convenient that the central layer hold the electronic security device and that, for that purpose, the central layer is the thickest layer, stacked structures may be formed in which the central layer is not the thickest or in which the electronic security device is located in another layer. Further, the central layer may be actually formed from two or more sublayers in order to facilitate the incorporation of security devices or otherwise to enhance the manufacturing processes.

It is preferred that the central layer be comprises of relatively dense, "weighty" material so as to contribute significant mass to the resulting value tokens. The insert, if used, may also contribute desirable mass. A number of plastic, rubber, clay, metal and other materials may be used to form the central layer and the insert, if employed. Preferred among these for simplicity in fabrication are acrylic resins filled with inorganic particulate such as silica or the even more weighty inorganic compounds such as barium, cesium, and other heavy, stable, metal oxides. Other materials from which the central layer and inserts may usefully be made include any species found suitable for use in the methods herein described.

The first and second outer layers which are superposed upon the central layer are conveniently designed so as to provide a visually appealing décor to the tokens. Traditional "poker chips" are limited in terms of their decorative opportunities and generally can only feature decals or other applied signage to their outer surfaces. Traditional plaques and jetons, on the other hand, can be formed from acrylic and other species, which offer the opportunity for enhanced decoration to those objects. In the present invention, it is preferred that outer layers formed from acrylic or other materials amenable to inclusion of highly decorative elements be employed. It is desired that new forms of chips, jetons and other forms of value tokens be prepared having improved properties. Such value tokens may employ either or both old and new materials, but in new formats and ways.

It will, thus, be seen that the stacked assembly is formed from the central layer, preferably with an included insert, but in any event carrying an electronic security device, superposed on either side by outer layers carrying decorative elements. It is preferred that each of the central and outer layers have a substantially identical peripheral geometries so that when laminated together to form a stacked structure, the edge shape will be generally identical. It will be understood that aesthetic, manufacturing and other aspects of the tokens to be made hereby may be formed with some of the layers having different peripheral geometries, so long as a sufficient thickness of the token exists having apertures filled with solid bodies and that the overall token has both integrity and aesthetics.

A further feature of the value tokens of the invention derives from inclusion of apertures in the periphery of each of the layers forming the stacked structure. When these are aligned, a place is formed for inclusion of solid bodies. When such solid bodies are included, typically by the use of adhesive or solvent, the overall stacked structure forming the value token may be seen to have different materials located at a number of locations on the periphery of the stack filling the apertures. These solid bodies are selected to have a different appearance from at least some of the other elements of the stack to give rise to contrast. As a result of this, the value tokens may be seen to have "spots" on their periphery in the say way that traditional clay poker chips are often provided with contrasting spots on their edges. This feature enhances sorting and evaluation of the value tokens by casino, bank, commercial or other workers. The solid bodies may be formed from any material consistent with the desired décor of the tokens, which is capable of being permanently adhered to the apertures. Exemplary materials include filled acrylic but numerous other materials may also be employed including clays, urethanes, and other materials suitable for the intended use.

The value tokens of the invention have been described in terms of three layers, the central layer and two outer layers. In practice it may be preferred to include a number of further layers to enhance the appearance and functionality of the tokens. Thus, one or more decorative or appearance contrasting layers may be included. The function of these layers, which may be made of the same or similar materials as the outer, decorative layers, can be to enhance the appearance or effect of the decorations carried by the outer layers. For example, a layer having the same peripheral shape as the other layers of the token may be included between the central layer and an outer layer or layers. Such appearance enhancing layers can, for example, be formed from a contrasting or a background color or apparent texture so that the decorative elements of the outer layer or layers are enhanced. Indeed, a plurality of appearance enhancing layers may be employed. While denominated as appearance enhancing, these layers may also serve other purposes, such as facilitating manufacturing, carrying security elements, or otherwise improving the appearance of function of the value tokens.

It will be understood that while the peripheral geometries of the layers are preferred to be generally the same to facilitate stacking, milling or smoothing of the finished tokens may be either desired or preferred. The outer geometry may even be provided with a particular finish or milling pattern to enhance appearance or security. All such embodiments are included herein.

In many embodiments of the invention, the value tokens may include a surface mounted element. Such element which may be in the form of a permanently mounted decal or sticker, may serve any of a plurality of functions. It is preferred that the surface mounted element appear on both sides of the value token and that they carry a visual indication of the attributed value carried by the token. The surface mounted element may also comprise a visual security attribute such as a hologram, microprinting, or other means of enhancing security in the token. While this feature has been referred to as a surface mounted element and, indeed, it is preferred that such element be applied through adhesion after the laminated stack of layers has been formed, the functions and effects of this element may also be provided by way of a further laminated layer or element. Additionally, an applied element providing some or all of the features of the surface mounted element may be placed upon one of the layers forming the stacked structure and the whole laminated or encapsulated to form a resulting value token. All such alternatives are included herein.

It is preferred that the electronic security element included within the value tokens of this invention include at a radiofrequency identification RFid circuit—commonly referred to as a "chip." It is preferred that the RFid chip of the tokens be activatable by application of radiofrequency energy such that a sensible, outgoing radiofrequency signal will be emitted by the chip. RFid is well known, per se. Given that the token of this invention represent value and, indeed, may represent very large value, it is preferred that the RFid circuit be adapted to emit a signal which is encrypted. Such signal may also preferably include a statement of the attributed value of the token and even of the individual identity of the specific value token originating the signal. In this way, careful track of tokens and their value may be had. For example in the context of a casino, RFid tracking of value tokens (in this context, chip, plaques or jetons) into and out of the Casse, to and from gaming tables, into and out of "chip racks" controlled by dealers and croupiers, and even to and from individual players' stacks and betting "spots" may be achieved.

While RFid security elements are preferred for many embodiments of this invention, other electronic and other security elements may be employed. Thus, for example, resonant antennas, known per se, may be included in tokens of the invention. While these are less flexible in use than RFid systems, benefits may, nonetheless, be enjoyed. Formulation or surface treatment of one or more of the components of the tokens of the invention, especially the decorative elements, may give rise to improved security. For example, inclusion of liquid crystal, specular dispersion or other elements within or upon the outer layers may confer an appearance which is both pleasing and difficult to counterfeit. Indeed, holographic effects may be included within the outer layers, not just upon one of the surface mounted elements. Further, "taggants" such as those used to identify lots of explosive materials, coded fiber mixtures, nanostructures and other things which are capable of rendering the value tokens of the present invention unique and/or difficult to counterfeit may be included within or upon the structure of the tokens.

The present invention may be applied to tokens having any of the traditional shapes of gaming tokens or traditional coinage. Additional shapes may be formed, however. The present stacked, laminated options of the invention may be used to form, for example, pentagonal "chips" or coins. Indeed, atraditional shapes may offer enhanced security opportunities. Such shapes give rise to the opportunity to provide chip and storage racks adapted for such shapes as well.

By reference to the drawings, FIG. 1 depicts a blow up of one of the value tokens 10 in accordance with the present invention. Central layer 12 is seen to have generally planar sides. The central layer also displays apertures on its periphery 14 as well as a further aperture 16. In the present embodiment, the further aperture 16, here a centrally disposed aperture, is sized to accept insert 50, which is provided with a radiofrequency identification circuit or chip, preferably embedded therein. The central layer is superposed on either side by, in this case, enhancing layers 30, which also have peripheral apertures 32. While these enhancing layers are optional, they are preferred to enhance the appearance or security of the token.

The enhancing layers are, in turn, superposed by outer layers 20 having apertures 22. The outer layers have decoration 24 on or in their structure. As will be appreciated, the foregoing layers may be formed into a stacked structure in which the peripheral apertures of the layers are aligned. This stacked structure is preferably permanently assembled through the use of adhesive or solvent for the materials of the layers. Alternatively, the stacked structure may be essentially permanently sealed through use of ultrasonic or other sealing. In any event, the apertures are all filled by solid bodies 40 which, preferably, are formed so as to provide visual contrast to the token. When assembled, the overall, stacked structure having solid bodies incorporated forms a weighty, smooth, tactile and visually pleasing form. The resulting value tokens may also include surface mounted elements 62 on either side. Such elements preferably carry indications of the attributed value of the token 60 as well as a visual security element, such as a hologram 64. It will be understood that as few as three layers and more than five layers may be employed in the present invention, in addition to surface mounted elements.

Figure 2:
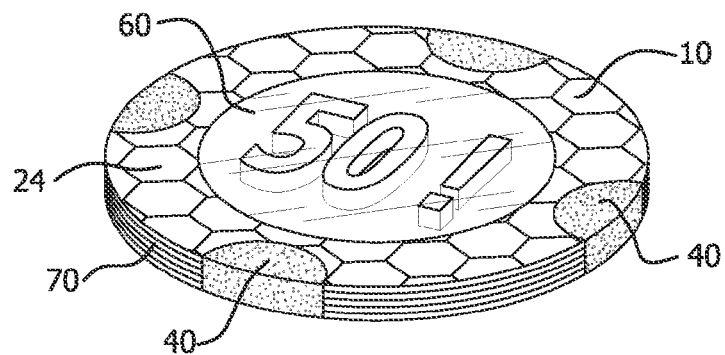
FIGS. 2, 3 and 4 depict value tokens in accordance with some embodiments of the invention.
Figure 3:
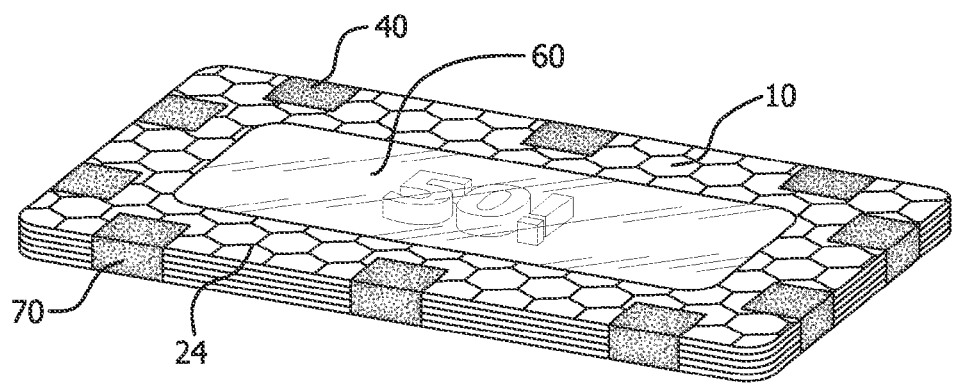
Figure 4:
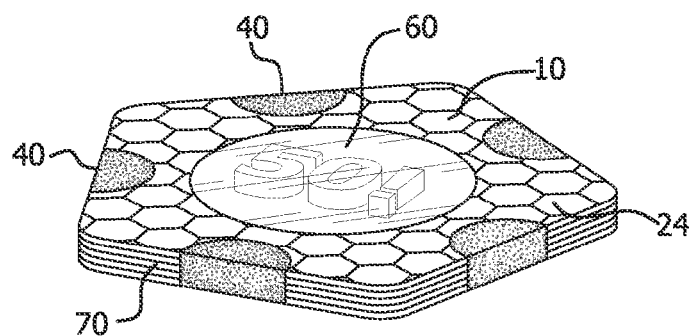
Figure 5A:
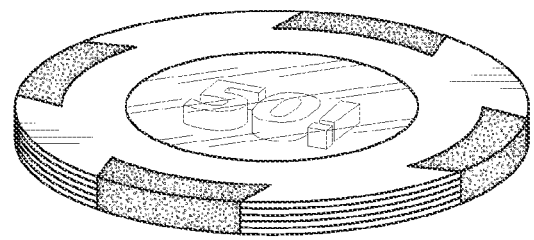
FIGS. 5a through 5i show some of the many embodiments which may be employed for integrating solid bodies in peripheral apertures in tokens of the present invention.
Figure 5B:
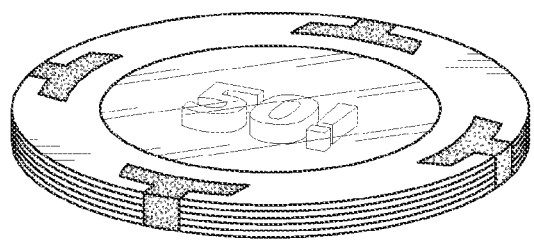
Figure 5C:
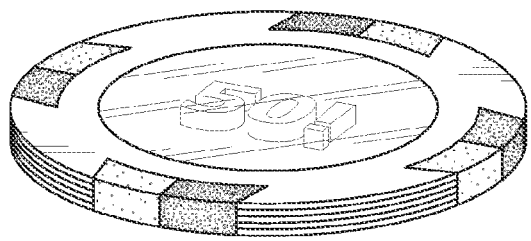
Figure 5D:
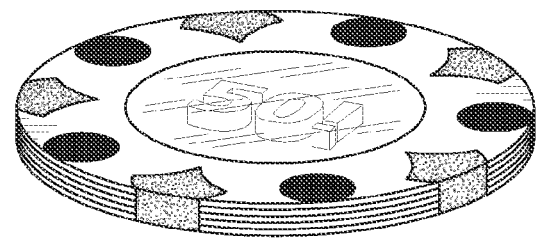
Figure 5E:
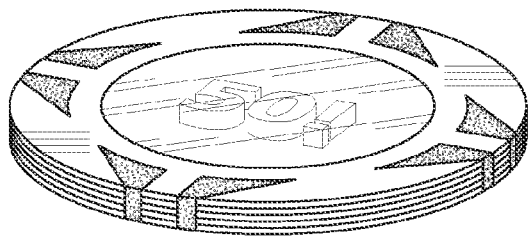
Figure 5F:
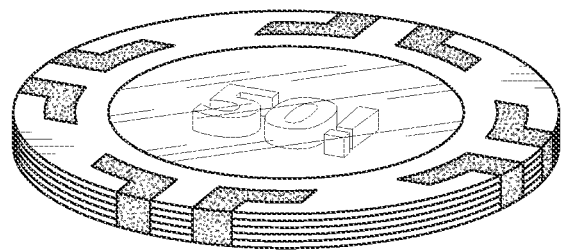
Figure 5G:
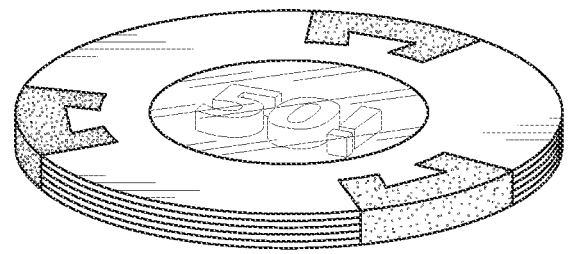
Figure 5H:
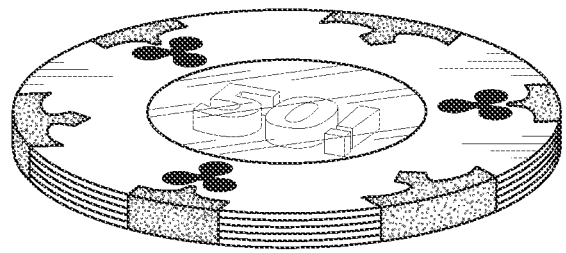
Figure 5I:
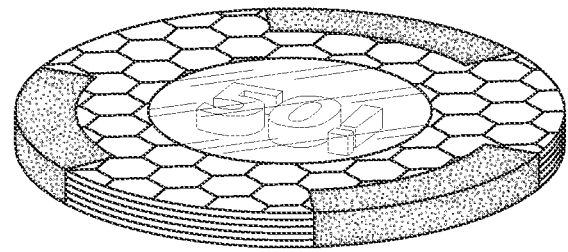

FIGS. 2, 3 and 4 depict value tokens in accordance with some embodiments of the invention. Each figure depicts a different overall shape of value token 10 with different arrangements of solid bodies 40. The shape and size of surface applied element 60 may vary as shown. The décor element of outer layers 24 are shown as well. In these figures, the layered structure 70 is shown. It will be understood that depending upon fabrication techniques, the layers may not actually be apparent in the resulting value tokens. Alternatively, the layers may be formulated such that the layered structure is apparent in the finished tokens and that they even contribute to the overall design and appearance.

FIGS. 5a through 5i illustrate the employment of numerous shapes and arrangements of peripheral apertures and solid bodies filling them in order to achieve different decorative and security features for the value tokens of this invention.

What is claimed is:

1. A value token comprising:
    a central layer having two substantially planar sides and at least one electronic security device;
    a first outer layer superposed upon a first of the sides of the central layer;
    a second outer layer superposed upon a second of the sides of the central layer, wherein the central layer and two outer layers are adhered or sealed to each other so as to form a stacked structure with each layer having a common peripheral geometry; and
    a plurality of apertures on the periphery of the stacked structure and passing through the stacked structure, each of said apertures being filled with a solid body.

2. The value token of claim 1 wherein the central layer comprises an aperture holding an insert comprising said electronic security device.

3. The value token of claim 1 wherein at least one of the first and second outer layers comprises at least one decorative element.

4. The value token of claim 1 further comprising at least one enhancing layer.

5. The value token of claim 1 wherein the solid bodies filling the peripheral apertures provides visual contrast to at least one other component of the token.

6. The value token of claim 1 further comprising at least one surface mounted element.

7. The value token of claim 6 wherein the surface mounted element displays an attributed value of the token.

8. The value token of claim 1 wherein the electronic security device is a radio frequency identification (RFID) device.

9. The value token of claim 8 wherein the RFID device holds an activatable signal indicative of an assigned value of the token.

10. The value token of claim 8 wherein the RFID device holds an activatable signal indicating an unique identity of an individual token.

11. The value token of claim 8 further comprising a resonance antenna.

12. The value token of claim 1 further comprising at least one visual security element.

13. The value token of claim 12 wherein at least one of the visual security elements is a hologram.

14. A value token comprising a set of stacked layers adhered or sealed to each other and with each layer having a substantially common peripheral geometry, comprising:
    a. a central layer containing at least one electronic security device;
    b. a contrast layer on each side of the central layer;
    c. a décor layer superposed on each of the contrast layers; and
    d. a plurality of apertures on the periphery of and passing through the set of stacked layers, each of said apertures being filled with a solid body having visual contrast with at least one other component of the stack.

15. The value token of claim 14 further comprising a visual indication of a value assigned to the token.

16. The value token of claim 14 further comprising at least one visual security element.

17. The value token of claim 14 having the overall shape of a disc.

18. The value token of claim 14 having the overall shape of a rectangular prism.

19. The value token of claim 14 wherein the electronic security device contains encrypted data indicative of an unique identity of the token.

* * * * *